United States Patent [19]

Seiver et al.

[11] 4,367,153

[45] Jan. 4, 1983

[54] COMPOSITION FOR USE IN A MAGNETICALLY FLUIDIZED BED

[75] Inventors: Robert L. Seiver; Martin O. Gernand, both of Baton Rouge, La.

[73] Assignee: Exxon Research And Engineering Co., Florham Park, N.J.

[21] Appl. No.: 218,086

[22] Filed: Dec. 19, 1980

Related U.S. Application Data

[63] Continuation-in-part of Ser. No. 943,553, Sep. 18, 1978, abandoned.

[51] Int. Cl.³ .......................... B01J 21/04; B01J 35/02
[52] U.S. Cl. ........................................ 252/62.55; 34/1; 34/10; 252/463; 252/477 R; 252/466 J; 428/404; 428/900
[58] Field of Search ...................... 252/62.55, 448, 463, 252/466 J, 472, 477 R; 428/403, 404, 693, 900; 34/1, 10

[56] References Cited

U.S. PATENT DOCUMENTS

| | | |
|---|---|---|
| 2,879,154 | 3/1959 | Campbell ..................... 252/62.55 X |
| 2,967,794 | 1/1961 | Coxe . |
| 3,042,543 | 7/1962 | Schuele ......................... 252/62.55 X |
| 3,440,731 | 4/1969 | Tuthill . |
| 3,708,177 | 1/1973 | Baerman . |
| 3,767,505 | 10/1973 | Coran et al. . |
| 3,849,213 | 11/1974 | Baerman . |
| 3,954,678 | 5/1976 | Marquisee ...................... 252/448 X |
| 3,977,918 | 8/1976 | Paladino et al. . |
| 3,979,334 | 9/1976 | Lee et al. ............................ 252/448 |
| 4,113,658 | 9/1978 | Geus et al. . |
| 4,136,016 | 1/1979 | Rosensweig et al. . |

OTHER PUBLICATIONS

Filipov "Prikladnaya Magnitogidrodinamika", Riga, 1960.

*Primary Examiner*—Jack Cooper
*Attorney, Agent, or Firm*—Llewellyn A. Proctor

[57] ABSTRACT

A composition which exhibits high induced magnetism in a small applied magnetic field when formed into a magnetically stabilized fluidized bed and which comprises particles containing a nonferromagnetic component, or components, composited with a plurality of elongated ferromagnetic components, randomly oriented and present in each of said particles in relatively low concentration, based on the total volume of the particles; a process for formation of said compositions and a process wherein such composite particles are formed into a magnetically stabilized fluidized bed and contacted with a fluid, preferably gas.

6 Claims, No Drawings

COMPOSITION FOR USE IN A MAGNETICALLY FLUIDIZED BED

BACKGROUND OF THE INVENTION AND PRIOR ART

This is a continuation-in-part of application Ser. No. 943,553 filed Sept. 18, 1978, now abandoned.

Recently it has been discovered that a fluidized bed of magnetizable particulate solids can be stabilized when operated under the influence of a magnetic field, and that such a bed is useful for conducting various fluid-solids contacting processes; inclusive particularly of adsorption, absorption, particulate removal and catalytic processes. Notable among these are gas-solids contacting processes primarily designed for particulate capture but which may also feature a catalytic reaction, or reactions; or the process may be primarily designed for conducting a chemical reaction, or reactions, with or without the feature of particulate capture. Processes of this type are conducted with composites wherein a ferromagnetic component is incorporated with the non-ferromagnetic component, or components, to render the composite ferromagnetic.

Like conventional fluidized processes a fluid, notably a gas, is injected upwardly at velocity sufficient to overcome the free fall velocities of the individual particles (due to gravity) and cause bed expansion and fluidization of the particles without sweeping significant amounts of the particles, catalytic or otherwise, from the bed. In conventional fluidized processes, however, the injection of gas at velocity sufficient to produce expansion of the bed (i.e., transform the fixed bed from a fixed packed bed to a fluidized bed) is accompanied by significant bubble formation whereas, in contrast, in a fluidized bed subjected to the influence of a magnetic field at conditions which does not increase the weight of the bed there exists an interim, or quiescent zone wherein there is little, if any, motion exhibited by the particles within the fluidized bed. Thus, within this zone the formation of bubbles and slugs are virtually eliminated due to the interaction between the fluidized ferromagnetic particles and the magnetic field; operation within such zone characterizing that of a magnetically stabilized bed.

Magnetically stabilized bed processes offer advantages over both fixed and fluidized bed operations. They provide superior operation over conventional fluidized bed operations in that they provide better counter-current contacting, low gas and solids back mixing, and lower particle attrition. They provide better operation as contrasted with fixed bed operations in that they provide lower pressure drop, better ability to transfer solids, and virtually eliminate bed plugging problems. A process disclosing a magnetic stabilized bed and its mode of operation for conducting catalytic reactions, and the capture of particulates to provide a filtering action is disclosed in U.S. Pat. No. 4,115,927 by Ronald E. Rosensweig.

Catalyst composites comprised of ferromagnetic inclusions dispersed within matrices constituted in part of nonferromagnetic materials and the subjection of beds of such particles to the influence of a magnetic field are known; albeit much of the early work dating back over the last decade was done with particulate ferromagnetic materials which were not catalytically active, or possessed of only limited catalytic activity. Thus, e.g., iron powder or steel balls, were of questionable merit as catalysts; or if catalytic to a limited extent, then the ferromagnetic component constituted essentially the whole of the catalyst. In any regard, a reference by Ivanov et al., *Zhurnal Prikladoni Khimii*, 43, 2200–2204 (1970) described catalytic particles characterized as $Fe_2O_3$ (88.16%), apparently the gamma phase of $Fe_2O_3$ which is magnetic, which were collected together to form a bed and subjected to the influence of a magnetic field. Ivanov et al., *Comptes rendus de l'Academie bulgare des Science*, Tome 23, No. 7, 787–790 (1970) discloses a fluidization process using a ferrochrome catalyst for the conversion of carbon oxide with water vapor in a magnetic field. U.S. Pat. No. 4,115,927, supra, discloses the use of a ferromagnetic nickel containing catalyst, supplied commercially by Chemetron Corporation known as Girdler G87RS in a magnetically stabilized fluidized bed. The catalyst is 40 wt. % nickel on an alumina support, prereduced and stabilized by the manufacturer. Known catalysts of magnetic character are thus characterized as systems wherein irregular shaped ferromagnetic particles, effectively approximating spherical shape, are dispersed in admixture with nonferromagnetic particles, or catalyst composites comprised of ferromagnetic particles effectively of approximately spherical shape incorporated as inclusions within nonferromagnetic materials which act as matrices for the ferromagnetic inclusions.

Whereas magnetically stabilized bed processes which utilize catalysts containing irregular shaped ferromagnetic inclusions, have proven useful in conducting various chemical reactions, notably hydrocarbon conversion reactions, their performance nonetheless falls far short of providing practical, economic commercial gas solid contacting processes. Simply stated, too much energy (and consequently too much cost) is required to maintain an effective magnetic field. Even in the use of a catalyst which contains a high concentration of particles, or inclusions of good ferromagnetic properties which ab initio may be sufficiently magnetic to meet borderline economics, the magnetic properties of the catalyst generally fade and grow poorer as the time of the operation is continued and extended. The problem is intensified due to shock, thermal excursions, or the like such that the bed of catalytic particles is gradually demagnetized as the time of operation of the process is extended.

Composite magnetic catalysts have thus proven far more difficult to magnetize than expected, and until recently it was believed that the geometry of the bed itself was the principal factor determinative of the effective magnetic field strength, $H_e$ developed within a bed, and that $H_e$ was equal to the applied magnetic field strength, $H_a$, diminished by a factor dM, as follows:

$$H_e = H_a - dM \qquad (1)$$

where d, a demagnetization coefficient $(0 < d < 1)$, was determined by the geometry of the entire bed, and the magnetization of M was taken as the volume average of magnetization of the bed. This led to the conclusion that bed geometries having long dimensions in the direction of the field and short dimensions perpendicular to it had low values of d, which were desirable, while geometries having long dimensions perpendicular to the field and short dimensions parallel to it had large, undesirable values of d. Consideration of the value of M also led to the conclusion that the magnetically stabilized fluidized bed, and associated magnetizing coil should have large dimensions in the direction of the field and small dimensions perpendicular to the field. However, composite magnetic catalysts, as suggested, have proven far more difficult to magnetize then expected. Pure ferromagnetic components showed roughly the expected behavior, saturating at the proper value and, when corrected for demagnetization, showed high susceptibilities. Composites which contained ferromagnetic inclusions, also saturated at the proper values, but showed low susceptibilities, even when corrected for demagnetization. Applied fields required to achieve a given magnetization proved an order of magnitude higher than predicted, and quite unfeasible for commercial operations.

It was found, however, that the particle itself, not the geometry of the bed per se was the most pertinent consideration determinative of the relation between $H_a$ and $H_e$, and in fact that the shape of the ferromagnetic inclusions, and their spacing and orientation within the particle itself were essential considerations in obtaining sufficiently effective field strengths for a given applied field (application Ser. No. 943,552, by Robert L. Seiver, filed Sept. 18, 1978, now abandoned herewith incorporated by reference). It was found, in fact, that the ferromagnetic inclusions were preferably of cylindrical shape, prolate spheroids or extremely oblate spheroids. Previously known composites with ferromagnetic inclusions effectively of approximately spherical shape have demagnetization coefficients similar to the demagnetizaton coefficient of a sphere, $d=\frac{1}{3}$. Particles with elongated inclusions, diluted within a nonferromagnetic matrix and used in magnetically stable fluidized beds in such a way that the inclusions had their elongated dimensions substantially parallel to the applied field, provided demagnetization coefficients significantly less than $\frac{1}{3}$. The preferred shapes, it was found, were those having considerably high L/D ratios, suitably L/D ratios ranging at least 2:1, and preferably 4:1, and higher. The best magnetic effects were obtained with particles wherein the elongate ferromagnetic inclusions were present in relatively high volumetric concentration and, the ferromagnetic inclusions were oriented with their long dimensions essentially parallel so that the composite could rotate, or turn in the magnetic field, to line up the long dimensions of the ferromagnetic inclusions parallel to the direction of the applied field.

A process was also developed for the formation of spheroidal or spherical particles, or beads, which exhibited high induced magnetism in a small applied field. The beads are individually comprised of a composite of alumina and elongate ferromagnetic inclusions the long dimensions of which are spaced apart and possessed of a high parallel orientation one inclusion relative to another (application Ser. No. 943,385 by F. X. Mayer et al. filed Sept. 8, 1978, herewith incorporated by reference). The process employed in the preparation of the beads requires generally the formation of an admixture of slow gelation hydrogel precursors (including a catalytic component, or components, if desired) and elongated ferromagnetic particles, parallel orientation of the particles within the hydrogel precursor in a magnetic field prior to gelation, formation of the admixture into beads, and gelation of the beads by passage through a hot immiscible liquid medium. Subsequently the composite is aged, or otherwise treated to develop the desired physical properties; and a catalytic component, or components, if not already added to the composite, is incorporated by impregnation, if desired.

With these discoveries it became feasible to conduct fluid-solids contacting processes, or catalytic reactions, at high induced magnetism in a small applied field. Despite its merits, however, the necessity of having to rely upon a single type of process and the stringent regimen of conditions required to produce acceptable composites, or catalysts, leaves much to be desired.

It is, accordingly, the primary objective of the present invention to obviate the foregoing and other disadvantages of processes which utilize magnetically stabilized fluidized beds for fluid-solids contacting, inclusive particularly of adsorption, absorption, particulate removal and catalytic processes.

A particular object is to provide a magnetically stabilized fluidized bed process across which an external magnetic field can be more effectively applied, i.e., to achieve higher magnetization at a given applied field and ferromagnetic component; or the same applied field with a component possessing less ferromagnetism or a less magnetically susceptible component; or combination of such effects.

A further object is to provide a magnetically stabilized fluidized bed process which utilizes a bed of ferromagnetic solids particles constituted of one or more ferromagnetic inclusions dispersed within a nonferromagnetic matrix material across which a field can be applied in a manner which provides lower demagnetization coefficients.

A more specific object is to provide composites of particulate material wherein magnetically soft ferromagnetic inclusions are dispersed in a matrix of nonferromagnetic material, inclusive particularly of composites of such character which also contain a catalytically active component, or components, these composites being particularly useful in magnetically stabilized fluidized beds for conducting gas-solids contacting, or for conducting catalytic reactions, or both.

These and other objects are achieved in accordance with the present invention which, in general, embodies:

(A) a composition, or article of manufacture, characterized as a particulate material which can be oriented within, and formed into a magnetically stabilized fluidized bed to exhibit high induced magnetism in a small applied field which comprises: particles of average size ranging from about 10 micrometers ($\mu$m) to about 4000 $\mu$m, preferably from about 50 $\mu$m to about 500 $\mu$m, each containing a nonferromagnetic component, or components, and preferably a catalytically active component, or components, and within each of which is composited a plurality of elongated ferromagnetic components, the ferromagnetic components being multidomain, having dimensions of at least 1 $\mu$m in all directions, elongated in one or two dimensions, and having a length:diameter (L/D) ratio of at least 2 but more more than 313, preferably not more than 30, said ferromagnetic component being present in the composite particles as inclusions within a nonferromagnetic matrix, arranged in such a way that essentially any ferromagnetic inclusion can be circumscribed in an imaginary sphere which does not include or intersect any other ferromagnetic inclusion, the ferromagnetic components being randomly oriented one ferromagnetic inclusion with respect to another, and constituting at least 0.5%, preferably at least 5%, but for particles elongated in one dimension not more than $2\pi/3(L/D+1)^2$, and for particles elongated in two dimensions not more than $\pi/2(L/D+1)$, of the total volume of each particle, where L/D is the average ratio of the longest dimension of ferromagnetic inclusion relative to the shortest dimension; and (B) a process wherein composite particles of (A) are formed into a magnetically stabilized fluidized bed, and the bed employed in said magnetic field while contacted with a fluid, preferably a gas, to provide a relatively high induced magnetism in a small applied magnetic field.

It has been found that the shape of the individual ferromagnetic inclusions of a composite structure is far more important than the shape of the bed in the operation of magnetically stabilized fluidized bed processes. The ferromagnetic inclusions of a composite particle, when they contain an axis which is sufficiently longer than other axes of said inclusion, and are sufficiently spaced apart from other ferromagnetic inclusions will, when formed into a bed and subjected to a magnetic field, provide far higher magnetization in a given applied field than particles otherwise identical and similarly dispersed except that the elongate ferromagnetic inclusions are spherical or of irregular shape as disclosed in prior art processes. The present invention is based on the further discovery that the substantially parallel orientation of the ferromagnetic inclusions, while important, is not essential in providing composites possessing higher magnetization than substantially spherical particles. Randomly oriented elongated particles, or particles which form inclusions, the long sides of which are randomly aligned one relative to another during the formation, and hydrogelation of the composite show considerably improved magnetization in an applied field vis-a-vis particles otherwise similar except that they contain ferromagnetic inclusions which are spherical; albeit composites wherein the elongate ferromagnetic inclusions are contained within the composites in substantially parallel alignment with the field show higher magnetism in the same applied field.

The high degree of induced magnetism produced by use of a bed of composite particles containing randomly oriented elongated ferromagnetic inclusions is indeed surprising, for it was expected, and predicted, that the random orientation of the ferromagnetic inclusions would behave in like manner with composites formed with spherical inclusions. It was thus believed that the random orientation would have produced a resultant effect wherein most of the forces would balance or cancel one another as is believed to occur in composites containing spherical shaped ferromagnetic inclusions. Rather than this, however, the random arrangement of the elongated ferromagnetic inclusions produced a particle capable of sufficiently high induced magnetism to be useful in many commercial operations; and though in fact such compositions do not possess induced magnetism on the same order of magnitude as composite particles wherein the elongate ferromagnetic inclusions are parallelly aligned, the relative ease in which the random orientation can be incorporated in composite particles makes it quite feasible to manufacture the composite particles by various known catalyst manufacturing processes; processes which cannot be used successfully for the production of compositions containing substantially parallelly oriented ferromagnetic inclusions.

The ferromagnetic inclusions, as used in this invention like those described in application Ser. No. 943,552, supra, are of essentially any shape, regular or irregular wherein one dimension is considerably longer than another, though shapes wherein the ferromagnetic inclusions are spherical, or effectively spheroid cannot be used. Nonoriented ferromagnetic inclusions, not truly spherical in the geometrical sense, may yet contain deviations from sphericity which are randomly directed and cancel each other so that they are, in effect spherical; and the sphere, with equal dimensions in all directions, does not provide high induced magnetism. Cylindrical shapes, oblate spheroids, or extremely prolate spheroids are the preferred shapes of the ferromagnetic inclusions. The ferromagnetic inclusions, used in the magnetically stable fluidized bed, necessarily have effective length:diameter (L/D) ratios considerably greater than unity, and are preferably considerably higher. Suitably the L/D ratios of the ferromagnetic inclusions range at least 2:1, preferably from about 3:1 to about 100:1, and more preferably from about 4:1 to about 30:1.

It is essential to use the externally applied field effectively to achieve high effective magnetization with any given ferromagnetic component. Or, stated alternatively, it is necessary in terms of commercial reality that a ferromagnetic component exhibit high induced magnetism in a small applied field. Conventional wisdom, however, would lead to the belief that the individual ferromagnetic inclusions would interact so much with each other that, in a magnetically stabilized fluidized bed, the over-all effect would be that of a large bar magnet. For example, in considering the action of a magnetic field on a bar magnet it is found that a soft ferromagnetic material can be magnetized when a magnetic field $\vec{H}$ is applied, and that a magnetic moment $\vec{m}$ is induced in the sample, which is related to the magnetization $\vec{M}$ by $\vec{M} = 4\pi(\vec{m}/V)$. This moment is due to current loops from unpaired electrons, but an equivalent and often useful viewpoint is that it is due to the separation of pairs of magnetic poles. The usefulness of this viewpoint lies in the fact that $4\pi$ lines of the $\vec{H}$ field terminate on each magnetic pole. However, it is the strength of $\vec{H}$ inside the ferromagnet which determine the magnetic moment, and all ferromagnets of similar material, which have the same magnetic moment [(number of poles) × (separation)], must have the same field strength $\vec{H}$ inside. For example, a bar magnet four units in length and one unit in width may contain two north poles and two south poles four units in length apart, and another of similar size may contain eight north poles and eight south poles one unit apart. Thus, although both have the same moment, the latter would be capable of cancelling $32\pi$ lines of $\vec{H}$ with its poles, and hence far more applied field is required to magnetize it than the other, which can cancel only $8\pi$ lines. One would thus expect a bed with the long dimension aligned with a field, or horizontally aligned bed to be superior to a bed having its long side vertically aligned with the field.

The amount of field lost, it would also be expected, would depend on the geometry of the bed through the demagnetization coefficient d, in accordance with model $H_e = H_a - dM$, supra. It has been found, however, that this model approximates objective reality for particle compositions which contain ferromagnetic inclusions with nonferromagnetic components, only when the ferromagnetic inclusions are present in high concentrations. The model is not valid for beds which contain the ferromagnetic inclusions in dilute concentration as required for catalysts for use in magnetically stabilized fluidized bed operations. Applicant, however, after considerable experimentation, study and rejection of this and various other models has discovered that the geometry for mathematical equation (1), supra, is that of the individual ferromagnetic inclusion, and its magnetization, not the magnetization of the entire bed.

Applicant feels no necessity, and therefore no desire of being bound by any specific theory of mechanism, but is nonetheless quite confident that he has formulated a model which adequately explains the true phenomena which are occurring in a fluidized bed of ferromagnetic solids operated under the influence of a magnetic field. This theory is given in detail in application Ser. No. 943,552, supra, i.e., at Pages 13–16 herewith incorporated by reference. In accordance with this model every individual ferromagnetic inclusion actually "sees," or experiences, the same external field, as opposed to the gross bed concept. Accordingly, a model which conforms to objective reality must include a term $d_fM_f$, wherein the terms d and M are as previously identified, and the subscript f is an average value of a ferromagnetic inclusion, rather than an average value taken over the entire bed. The magnetic field experienced by an inclusion has been found to conform substantially to that within a Lorentz polarization sphere.

The present process, and compositions, are useful in various processes inclusive particularly of adsorption, absorption, particulate removal and catalytic processes. The compositions are particularly useful as filters for the removal of contaminant particles from a gas stream, whether or not the particles additionally function as catalysts. The process, and compositions, are also particularly useful in conducting hydrocarbon conversion reactions illustrative of which are fluid hydroforming (reforming), catalytic cracking, isomerization, coking, polymerization, hydrofining, alkylation, partial oxidation, halogenation, dehydrogenation, desulfurization, reductions, gasification of coal, fluid bed combustion of coal, coal liquefaction, retorting of oil shale and the like.

In the preparation of particulate solids, or catalysts for use in the practice of this invention it is essential that the elongate ferromagnetic particles present in an aggregate of the particles, or as inclusions within a composite, be spaced apart one from another, separated, or present in dilute concentration so that each experiences the applied field.

Specifically, essentially each ferromagnetic inclusion should be sufficiently separated from all others that an imaginary sphere, the Lorentz sphere, can be circumscribed around it, which neither includes nor intersects any other ferromagnetic inclusion, around said ferromagnetic inclusion. Simple geometrical considerations show that this condition imposes an upper limit to the volume fraction of the ferromagnetic inclusions in each composite particle, depending on the specific embodiment of the invention, as follows: (1) for a plurality of particles, each containing a plurality of ferromagnetic inclusions elongated in one dimension, approximating the shape of the inclusions as cylindrical needles of average length L and diameter D, the upper limit is $2\pi/3(L/D+1)^2$; and (2) for a plurality of particles, each containing a plurality of ferromagnetic inclusions elongated in two dimensions, approximating the shape of the inclusions as cylindrical discs of diameter L and thickness D, the upper limit is $\pi/2(L/D+1)$. The further requirement that the elongation L/D shall be at least 2 necessarily sets absolute upper limits on the volume fraction of the ferromagnetic inclusions as follows: (1) 23.3% and (2) 52.4%, respectively, supra. Likewise, the requirement that the ferromagnetic inclusions constitute at least 0.5%, and preferably 5%, of the volume of the particles sets upper limits on the elongation of the ferromagnetic inclusions as follows: (1) the L/D cannot exceed 19.5, preferably 5.5; and for (2) the L/D cannot exceed 313, preferably 30, respectively, supra.

It is essential in the formation of particulate solids, or catalysts that the elongate ferromagnetic inclusion, or inclusions be dispersed within the nonferromagnetic material such that it serves as a matrix, or continuous phase surrounding said inclusion, or inclusions. In the formation of catalysts, it is also essential that the catalytic component, or components, be well dispersed upon the surface of the particles in catalytic amounts. The catalytic component, or components, is dispersed to a high surface area state upon the surface of the particles; the particles serving the same function as conventional catalyst supports. In a catalytically effective state of dispersion, a catalytically active concentration of the catalytic component, or components, is present on the surface of the particles in essentially atomically dispersed form, as defined by the size of the crystals of the dispersed catalytic component, or components (length of a side of an assumed cubic crystallite).

The ferromagnetic inclusions are thus particles elongated along one axis to provide needle-like shapes, or along two axes to provide flat plates, these permitting the use of composites which require low practical fields for conducting commercial magnetically stabilized fluidized bed operations. Methods for physically shaping ferromagnetic metals, or ferromagnetic alloys, e.g., by drawing forms to provide needle-like shapes or ball-milling metal powders to form flat platelets having the desired length:diameter ratios are preferred. Illustrative of such ferromagnetic metals, or alloys, are iron, steel, cobalt, nickel, or alloys of these and other metals such as FeAl, FeCrAl, FeCrAlY, FeSi and various inorganic crystalline materials and the like. The ferromagnetic inclusions are readily formed into shapes having length:diameter ratios ranging from about 3:1 to about 100:1, preferably from about 4:1 to about 30;1, with nominal diameters ranging from about 1 to about 50 microns, preferably from about 2 to about 25 microns. Whereas the length of the inclusions is limited by the relatively small dimensions of the particles themselves, the metals can be drawn repetitively until large L/D ratios are achieved by limited dimensions imposed on the diameter of the inclusions. The ferromagnetic inclusions are suitably admixed with and gelled with a precursor support material, e.g., an alumina precursor support material in the concentrations required to provide the desired volume dilution of the ferromagnetic inclusions within the support matrix.

In formation of the compositions, elongated ferromagnetic particles, a catalyst component, or components, if desired, and hydrogel precursors, preferably alumina hydrogel precursors, are admixed together and the admixture gelled such that the elongated ferromagnetic particles are set as inclusions within the hydrogel precursor which serves as a matrix for the randomly dispersed elongated ferromagnetic particles. Suitably, the hydrogel precursors are dissolved in a solution, or the hydrogel precursor components dissolved in separate solutions which are brought together, or admixed with the elongated ferromagnetic particles prior to formation of the gel. The admixture is gelled at the conditions required to produce the properties desired in the support and, if desired, the support can be further treated after gellation to further develop the desired properties. A catalytic component, or components, or an additional catalytic component, or components can be added, suitably by impregnation, after the support is formed.

The catalysts of this invention may be in the form of powder, beads, tablets, pills, or pellets or extrudates depending upon the type of process. Composites with highly elongated ferromagnetic inclusions, permit the use of low practical fields for commercial magnetically stabilized fluidized bed reactions. The use of ferromagnetic inclusions, elongated along one axis to provide needle-like shapes, or along two axes to provide flat plate-like shapes provide the desired improvements. Various ferromagnetic substances, including but not limited to magnetite $Fe_3O_4$, $\gamma$-iron oxide ($Fe_2O_3$), ferrites of the form $XO.Fe_2O_3$, wherein X is a metal or mixture of metals such as Zn, Mn, Cu, etc.; ferromagnetic elements including iron, nickel, cobalt and gadolinium, alloys of ferromagnetic elements, etc. if of elongate shape may be used as ferromagnetic inclusions. Nonmagnetic materials can be coated with or dispersed within solids having the quality of ferromagnetism to provide the ferromagnetic inclusions. Generally, a ferromagnetic composite is incorporated with a nonmagnetic catalytic material, and the fluidized bed containing such composites can also include particulate solids which are nonmagnetizable. The longest side of the ferromagnetic particles or inclusions can range to 4000 microns ($\mu m$), and higher, but generally range from about 2 to about 1000 $\mu m$, preferably from about 50 $\mu m$ to about 500 $\mu m$. The smaller diameter of the particles generally ranges from about 1 to about 500 $\mu m$, preferably from about 2 to about 100 $\mu m$. In order for each ferromagnetic inclusion to behave as a typical ferromagnet, independently experiencing the magnetic field, it is necessary that each inclusion contain multiple magnetic domains. This requirement is generally met if all dimensions of the inclusion exceed 1 $\mu m$. Smaller ferromagnetic particles, containing only one magnetic domain, behave as permanent, hard, magnets even if they are composed of magnetically soft material, and do not respond smoothly or reproducibly to the applied field. A preferred technique for providing the elongated ferromagnetic particles for use as inclusions is by physical shaping methods, e.g., by the ball milling of a ferromagnetic metallic powder, e.g., iron, iron alloys such as steel, cobalt, alloys of cobalt, nickel, alloys of nickel and the like.

The elongated ferromagnetic particles can be randomly admixed with various gels and sols, set therein within a hydrogel matrix in virtually any form, i.e., as pills, tablets, extrudates, beads or the like. In a preferred embodiment, e.g., elongated ferromagnetic particles are admixed with a hydrous form of alumina and an inorganic acid or aluminum salt of an inorganic acid constituted in part of an anion soluble in an alkaline solution, preferably in a stirred aqueous solution maintained at a pH of from about 8 to about 12, preferably from about 9 to about 10. The alumina, with the included elongated ferromagnetic particles, is normally precipitated by combining solution, (a) a first of which contains an alkali metal aluminate, e.g., $NaAlO_2$, and (b) a second of which contains a strong mineral acid or an aluminum salt of a strong mineral acid, the anion portion of which is soluble in an alkaline solution, e.g., $Al_2(SO_4)_3$.

If desired, a catalytically active amount of a metal component, or components, can be incorporated within the precipitated alumina, e.g., a Group VI-B or Group VIII metal, or both (Periodic Table of the Elements, E. H. Sargent and Co., copyright 1962 Dyna-Slide Co.) where hydrogenation (hydrogen transfer) properties are desired; or the catalytic component, or components, can be added subsequent to calcination. Silica can be added, if desired, to ultimately produce a "glassy" alumina or to increase the resistance of the composition to sintering. The temperature of precipitation ranges generally from about 15° F. to about 120° F., and preferably from about 32° F. to about 70° F. Suitably, the concentration of alumina contained within the sum-total of the solution ranges from about 1 to about 10 weight percent, preferably from about 2 to about 5 weight percent.

The precipitated alumina hydrogel, is preferably washed with water or aqueous solution, suitably at ambient temperature or temperatures ranging from about 70° F. to about 85° F., to remove essentially all of the soluble salt, e.g., $Na_2SO_4$, removal of a large part of the sulfate from the alumina hydrogel being desirable to achieve high surface area and good catalytic activity in the finished catalyst, where the composite is to be employed as a catalyst; and it is then dried, suitably at temperatures ranging from about 85° F. to about 350° F., and preferably from about 212° F. to about 250° F., to form a gel. The gel, after drying, exists as a granular substance which can, by proper adjustment of its solids (or liquid) content, be formed into various shapes, e.g., extrudates or spheres, after which time the shapes can then be dried, calcined and, if a catalytic component, or components, has not been added, or if an additional catalytic component, or components, is desired, the gel can be impregnated with a catalytic component, or components.

Compositions, and catalysts, can also be formed as spheroidal or spherical forms of alumina by admixing, or commingling of an alumina sol and a weak base to provide an alumina precursor having a relatively slow rate of hydrolysis at low temperature, and relatively high rate of hydrolysis at elevated temperature, without evolution of gas. This is readily accomplished by the use of a weak base having a strong buffering action at pH ranging from about 4 to about 10, preferably from about 5 to about 8, the system providing differing rates of hydrolysis at these different temperatures. The sol can be virtually any soluble form of an aluminum compound, suitably an aluminum salt soluble in an aqueous medium, which can be gelled, but rather slowly by the addition at low temperature of relatively large, or copious amounts of a weak base. The sol and weak base, with the ferromagnetic inclusions, are added together; the sol and weak base generally being employed as solutions to one or both of which the ferromagnetic inclusions are added and the solutions then admixed one with the other. The random orientation of the ferromagnetic particles within the individual spherical particles, or beads, provides a significant advantage as contrasted with conventional composites.

In its preferred aspects, a solution, or solutions, of the sol and weak base are admixed at ambient or low temperature with the desired quantity of the ferromagnetic inclusions in a stirred pot or vessel (admixing zone). The admixture is then introduced as a spray, or as immiscible droplets (from an atomizer, or rotating surface) onto the surface of a heated pool of liquid, the density of which is different from, suitably lesser than that of droplets, gellation occurring as the droplets sink, or fall toward the bottom of the heated pool of liquid. Sols suitable for the practice of this invention are sodium aluminate, acid salts of aluminum such as aluminum sulfate, aluminum chloride, and the various hydroxy chlorides of alumina. A preferred sol is one which contains from about 15 percent to about 35 percent by weight of alumina, calculated as $Al_2O_3$. Sols of greater alumina concentration generally set too fast, this resulting in spheres which crack easily due to their brittleness, and often fail to permit firm bonding of the ferromagnetic inclusions. On the other hand, sols having a lower concentration of $Al_2O_3$ produce spheroids or spheres which are too soft.

In a preferred method of preparing an alumina sol, aluminum metal is added to an aqueous solution of aluminum chloride (or aluminum nitrate) and the mixture heated at its boiling point, ranging generally from about 175° F. to about 220° F. The time of heating and digesting will depend upon the purity and particle size of the aluminum metal employed. With a substantially pure metal, the time of heating and digesting can range from about 24 to 72 hours, or more, but this period will be less with increased impurities in the metal. It is preferred to utilize substantially pure aluminum metal, and substantially pure aluminum chloride to produce the alumina sol, which can be represented approximately by the formula $4\frac{1}{2}Al(OH)_3.AlCl_3$. In the preparation, the mol ratio of aluminum chloride to aluminum metal is preferably maintained within the range of from about 1:3 to about 1:5, since ratios of aluminum chloride to aluminum metal substantially outside of this range result in sols which set immediately into a precipitate upon the addition of the weak base, or results in the formation of gel spheres which are too soft.

An alumina sol may also be prepared to contain a higher alumina to chlorine ratio by effecting the heating and digestion of the aluminum chloride in the presence of higher concentrations of aluminum metal, i.e., within a range of from about 1:5 to about 1:7 mol ratios of aluminum chloride to aluminum metal. In this embodiment it is important to use a more dilute solution of the alumina sol, the solution containing from about 5% to about 15% by weight of alumina calculated as $Al_2O_3$. With these low concentrations of alumina in the sol having a higher alumina to chlorine ratio, satisfactory alumina spheres can be prepared by using smaller volume ratios of the weak base.

Suitable weak bases for the practice of this invention are exemplified by urea, mixtures of ammonium acetate and ammonium hydroxide, or the condensation products of other alkyl aldehyde with ammonia. A particularly preferred weak base is hexamethylene tetramine, represented by the formula $(CH_2)_6N_4$, which is also referred to as metheneamine, formin, etc. Hexamethylene tetramine is readily prepared by the reaction of formaldehyde with ammonia, and it has been found that an approximately 30% solution is particularly satisfactory for ease of handling and, when the water in the alumina sol ranges from about 65 to about 85 percent, there results a final mixture of desired water content. However, the hexamethylene tetramine solution may vary from about a 15% solution to about a 40% solution, the latter being substantially the saturation point. As the amount of water is increased in the hexamethylene tetramine solution, the amount of water in the alumina sol must be decreased accordingly, and vice versa.

The concentration of the hexamethylene tetramine solution may range from about 1:2 to about 1:20 volumes of hexamethylene tetramine solution per volume of alumina sol solution. Satisfactory spheres can be prepared using 1 volume of hexamethyulene tetramine solution to 10 volumes of alumina sol. Generally, however, the volume concentrations of hexamethylene tetramine that can be used satisfactorily is dependent on the mol ratio of aluminum chloride to aluminum metal used in the heating and digesting step and on the concentration of alumina in the diluted solution. Higher volumes of hexamethylene tetramine solution are required with higher ratios of aluminum chloride to aluminum metal in the heating with higher ratios of aluminum chloride to aluminum metal in the heating and digesting step and with higher alumina concentrations in the aqueous solution of the sol.

The liquid medium, or bath, must be at an elevated temperature to produce gelation, particularly gelation within a practical time period. A particularly suitable liquid medium to which the ingredients for gelation are added is one comprised of an organo-, or hydrocarbon liquid such as kerosene, Nujol, Primol D, gas oil or other liquid in which the droplets are immiscible, said gelation ingredients forming into spheroids or spherical shapes which settle (or ascend) at a rate sufficient to form a firm hydrogel during passage through said liquid medium. The temperature of the suspending medium ranges generally from about 120° F. to about 220° F., preferably from about 190° F. to about 205° F. Temperatures below 120° F. require undue extension of the setting times, this necessitating a body of suspending medium which is excessive for practical purposes. On the other hand, temperatures above about 220° F. result in vaporization of the water and cracking of the spheres. The time in which the spheres remain in the liquid medium should be sufficient to form rigid spheres which will not crack or become distorted when removed from the liquid medium. Time and temperature are inversely interrelated, and can be correlated to obtain spheres or beads of the desired rigidity. As the temperature is increased the time can be decreased, and conversely as the time is increased the temperature can be decreased.

Suitably, the beads are removed from the bottom, or lower portion of the column, or zone, containing the liquid medium, generally with a flow of the liquid from which the beads are separated and the liquid recycled. The beads are then aged in the presence of a basic medium prior to contact with water.

In general, the spheres or beads are aged at an elevated temperature in the presence of a liquid medium, i.e., a bath of liquid similar to that in which the beads are gelled, for a period of at least 10 hours, and preferably of from about 16 to 24 hours or more at temperatures ranging from about 150° F. to about 212° F., preferably from about 190° F. to about 210° F.

Spheres, or beads, of different densities can be obtained by varying the time of aging. For example, spheres of density greater than about 0.7, i.e., high density spheres, are obtained by aging the beads in a weak base, preferably a weak base having the same characteristics as the weak base originally used in preparing the spheres. The aging step is effected at temperatures ranging from about 150° F. to about 212° F., preferably of from about 190° F. to about 210° F., for a period of at least 10 hours, preferably from about 16 to about 24 hours, or more. In a preferred embodiment the beads are aged in the same liquid as that of which the liquid medium in which the beads were gelled, suitably hexamethylene tetramine.

When spheres, or beads, of intermediate or high densities are desired, i.e., above about 0.5, the beads are aged for at least 10 hours at a temperature above about 124° F. in an oil which preferably is the same as the liquid medium, or both, and subsequently the beads are aged in ammonium hydroxide solution for at least 10 hours. The exact density of the spheres will depend upon the concentration and temperature of the ammonium hydroxide solution, higher densities being obtained with lower concentrations at lower temperatures.

When low density spheres are desired, i.e., densities below about 0.5, the beads are aged in an oil of the type used as the liquid medium, or both, at an elevated temperature and subsequently in an ammonium hydroxide solution, preferably one which contains about 4 to 5% ammonia, at elevated temperature above about 125° F., but generally to greater than about 220° F. The spheres, or beads, are aged for at least 10 hours. The concentration of the ammonium hydroxide largely determines the density of the spheres and, therefore, higher density spheres can be obtained with a less concentrated solution, or by the use of a lower volume of solution in the bath.

After aging, the spheres, or beads, are washed in any suitable manner. A particularly satisfactory method is to wash the spheres by percolation, either with upward or downward flow of water, and preferably with ater containing a small amount of ammonium hydroxide or ammonium nitrate, or both. After washing, the spheres can be dried at temperatures ranging from about 200° F. to about 600° F., for periods ranging from about 2 to 24 hours or more, or dried at this temperature and then calcined, suitably at temperatures of from about 800° F. to about 1400° F., for periods ranging from about 2 to 12 hours or more. The beads can then be used as such, or composited with catalytic components. It is preferred that the spheres be dried slowly in a humid atmosphere because this has been found to result in less breakage of the spheres. The spheres or beads can also be treated with catalytic components prior to the drying, or drying and calcining operations, and the final catalyst composite then may be subjected to further drying and calcining as desired.

In another embodiment, especially in the preparation of high density spheres, the spheres or beads can be given a quick wash, dried at a temperature of from about 200° F. to about 300° F. in a high humidity atmosphere, calcined at temperatures ranging from about 800° F. to about 1400° F. and further washed, preferably with water containing ammonium hydroxide or ammonium nitrate, or both. Care must be exercised in preventing the spheres from absorbing moisture from the air which will occur before the spheres are subjected to high temperatured drying, and this is particularly applicable to the high density spheres. Therefore, it is preferred to dry and calcine the high density spheres immediately after aging without permitting the spheres to cool.

The spheres or beads are preferably used as catalysts, and various catalytic metals can be combined with the finished composite including those metals conventionally employed in such processes as fluid catalytic cracking, reforming, hydrogenation, hydrocracking, isomerization, alkylation, polymerization, oxidation and the like.

The matrix portion of particles, viz, the refractory porous inorganic oxide or alumina component of the spheres or beads, provides a support with which the catalytic component, or components, can be composited, in catalytically effective amount. The catalysts are formed suitably by cogellation with a catalytic metal component, or components, or by impregnation of the particles with a solution which contains a soluble compound, or compounds, of the metal, or metals. The matrix material can be constituted of, or contain, for example, one or more of alumina, bentonite, clay, diatomaceous earth, zeolite, silica, magnesia, zirconia, thoria, and the like. The most preferred matrix material is alumina to which, if desired, can be added a suitable amount of other refractory carrier materials such as silica, zirconia, magnesia, titania, etc., usually in a range of about 1 to 20 percent, based on the weight of the support. Exemplary of a matrix material for the practice of the present invention is one having a surface area of more than 50 m$^2$/g, preferably from about 100 to about 300 m$^2$/g, and higher, a bulk density of about 0.3 to 1.0 g/ml, and higher, an average pore volume of about 0.2 to 1.1 ml/g, and an average pore diameter ranging about 30 Å to about 300 Å, and higher.

When used, e.g., in hydrotreating or hydrofining reactions the catalyst component is one wherein one or more hydrogenating components are added to the finished compositions comprising the transition metals as found in Groups IV-B, V-B, VI-B, VII-B, VIII, of the periodic Table of the Elements (Sargent Welch and Company, copyright 1968). Examples of suitable hydrogenating metals include, e.g., nickel, cobalt, molybdenum, tungsten, platinum, palladium, ruthenium, rhenium, iridium, and the like. Mixtures of any two or more of such hydrogenating components can also be employed, e.g., nickel or cobalt, or the combination thereof, in the form of metal, oxide, sulfide or any combination thereof, and molybdenum or tungsten, or the combination thereof, in the form of metal, oxide, sulfide or any combination thereof. The total amount of hydrogenating component supported on the finished material can range from about 2 to 25 percent, preferably 5 to about 20 percent, based on the weight of the catalyst composition. A typical hydrofining catalyst includes from about 3 to about 8 weight percent molybdenum oxide and/or tungsten oxide, calculated as the metal oxide. Reforming catalysts can also be formed, e.g., by compositing with the finished materials a metal, or metals, such as obtained from Group VIII, e.g., platinum, iridium, rhodium, pallladium, or the like.

The invention will be more fully understood by reference to the following selected non-limiting examples and comparative data which illustrate its more salient features. All parts are given in terms of weight unless otherwise specified.

The following Examples 1-3 are reference demonstrations based on the prior art. Example 1 establishes the behavior of previously known materials, and shows that for randomly oriented materials the particle magnetization is a function of the concentration of the magnetic component as long as the concentration is not too high. The maximum concentration examined was 78 wt. %. Example 2 shows that at 92.3 wt. %, or 56.6 vol. % concentration of stainless steel on alumina, particle to particle interactions start to occur that lower the magnetic moment of the particles. Example 3 shows that beads which contain nonoriented, or random stainless steel ferromagnetic inclusions, exhibit similar behavior to composite materials of Example 1.

EXAMPLE 1

Magnetic composite materials were prepared from atomized 410 stainless steel powder in a range of concentrations, matrices, and particle sizes. Preparative techniques included: (1) mixing the 410 stainless steel powder with a silica-alumina gel or an alumina gel and spray-drying the mixture to form a composite powder, (2) spray-drying as in (1) and then calcining the resulting powder; (3) mixing the 410 stainless steel powder with alumina powder or polypropylene powder and pressing a pellet of the mixture in a hydraulic press; and (4) mixing the stainless steel powder with silica-alumina gel and allowing the entire mixture to harden in a tray, then crushing the resulting block to form a composite powder. Concentration of stainless steel in the finished composites varied form 0.4 wt. % to 78 wt. %, and from 0.09 Vol. % to 39 Vol. %. In all cases, the volume percent stainless steel in the composite was substantially less than the volume percent stainless steel in the pure stainless steel powder (47%), so that there was substantially no direct contact of stainless steel particles within any of these composites. A very fine mesh cut of the atomized stainless steel, with particle sizes from 0 to 30 $\mu$m, was used in some preparations. A coarser cut, with particle sizes from 20 to 44 $\mu$m, was used in the other preparations. A total of 20 different composites were prepared.

The magnetic properties of all these samples were measured using a Princeton Applied Research Model 155 Vibrating Sample Magnetometer and a conventional laboratory electromagnet. Sample shape was varied as much as the magnetometer sample holder would permit; all samples were approximately cylindrical, with their cylinder axis perpendicular to the applied field in the magnetometer. Sample diameters could only be varied from 0.32 to 0.38 cm, but sample lengths were varied from 0.25 to 0.97 cm.

It was found that stainless steel content was the only one of these variables that had a major influence on the magnetic properties of the composite. Magnetic moment at saturation was directly proportional to stainless steel content, with a proportionality constant of 171.5 emu/g stainless steel. In addition, the magnetic moment resulting when a given field was applied to an initially demagnetized sample was found to be principally determined by the stainless steel content. In particular, when an applied field of 200 oersteds was applied to each of the twenty initially demagnetized samples, the induced magnetic moment averaged 12.4 emu per gram of stainless steel in the sample, with a standard deviation of only $\pm 1.5$ emu/g.

EXAMPLE 2

A composite sample was prepared by mixing 410 stainless steel powder with alumina and pressing a pellet in a hydraulic press, just as in Example 1, except that the sample contained 92.3 weight percent stainless steel. Under the pressure of the hydraulic press, the sample was compressed to the extent that it contained 56.6 volume percent stainless steel, somewhat greater than the original loose stainless steel powder. There was, therefore, extensive particle to particle contact between the stainless steel particles in this composite. The 0–30 $\mu$m mesh cut of 410 stainless steel powder was used in this composite, the sample diameter was 0.322 cm, and the sample length was 0.374 cm.

When this sample was demagnetized and a field of 200 oersteds was applied, the induced magnetic moment was only 8.9 emu per gram of stainless steel, significantly lower than the value of 12.4 emu/g from Example 1. This demonstrates that the magnetic interactions and magnetic behavior of magnetically dilute composites, where the magnetic particles are substantially separated from one another, are qualitatively different from the magnetic interactions and magnetic behavior of magnetically concentrated composites. Much, if not all, of the prior art teaching the advantages of orienting magnetic particles refers to highly concentrated magnetic materials. This invention, however, is specifically directed to magnetically dilute particulate composites, containing less than 52.4 volume percent magnetic component, or less than 23.3 volume percent magnetic component.

EXAMPLE 3

A composite magnetic material in the form of beads was formed by mixing 0–30 $\mu$m 410 stainless steel powder with an aqueous solution of aluminum hydroxychloride and hexamethylenetetramine, and then adding droplets of the mixture to the top of a hot oil column kept at about 190° F. Surface tension caused the droplets to take a spherical form, and the heat caused the alumina solution to gel before the droplets reached the bottom of the oil column. The product, after further curing, was a 410 stainless steel/alumina composite in the form of spherical beads. The magnetic behavior of one of these beads was determined. It contained 39.4 wt. % (10.2 Vol. %) 410 stainless steel and had a diameter of 0.21 cm. Its magnetic properties were found to be isotropic and substantially the same as the magnetic properties of the composites mentioned in Example 1. In particular, after being demagnetized, its magnetic moment at 200 Oe applied field was 10.6 emu per gram stainless steel.

The following Example 4 shows the improvements which can be achieved by the use of particles which are comprised of elongated ferromagnetic inclusions composited with a matrix of an inorganic metal oxide base.

EXAMPLE 4

Elongated particles of 410 stainless steel were prepared by ballmilling atomized metal powder. A portion of a 0–44 $\mu$m mesh cut of atomized 410 stainless steel powder was placed in a ballmill and processed for 24 hours, in the presence of sterotex as a lubricant. The stainless steel powder was recovered and cleaned. Examination by sieve analysis and by scanning electron microscopy showed that the ballmilling resulted in very little particle size reduction, and that the principal effect of the ballmilling was to crush the stainless steel particles into flat, elongated, slab-like particles.

Some of these elongated 410 stainless steel particles were incorporated into a composite by mixing them with silica-alumina gel and spray-drying the mixture to form a powder. Others of these elongated 410 stainless steel particles were incorporated into composite beads by mixing with alumina precursor, dropping through a hot oil column, and curing as in Example 3. During the preparation of these beads, no magnetic field except the earth's field was present.

A sample of this spray-dried powder and two of these beads were characterized in the magnetometer. The beads were found to be substantially isotropic. The properties of the beads and sprayed-dried powder composites are summarized in the Table below.

TABLE

| | Spray-Dried Powder with Ballmilled SS | First Random Bead with Ballmilled SS | Second Random Bead with Ballmilled SS |
| --- | --- | --- | --- |
| Wt. % 410 Stainless Steel | 20.7 | 29.2 | 34.1 |
| Vol. % 410 Stainless Steel | 1.8 | 6.7 | 6.2 |
| Diameter, cm | 0.38 | 0.18 | 0.20 |
| Length, cm | 0.53 | — | — |
| Magnetic Moment at 200 Oe, emu/g SS | 20.8 | 16.6 | 17.0 |
| Improvements over Example 1, Ratio | 1.7 | 1.3 | 1.4 |

This example thus clearly shows that in a magnetically stabilized fluidized bed, at a moderate applied field, composite materials prepared with elongated magnetic particles have a magnetization 1.3 to 1.7 times as great as if the included metal particles had not been treated to increase their elongation.

It is apparent that various modifications and changes can be made in the conditions of operation, the identity of the ferromagnetic particle or inclusion used in forming an admixture or composite, the nature of the catalytic component, or components, and manner of incorporation, and the like, without departing the spirit and scope of the invention.

Having described the invention, what is claimed is:

1. As a composition of matter, particulate material which can be formed into a magnetically stabilized fluidized bed to provide high magnetization at a low applied field which comprises particles of average size ranging from about 10 μm to about 4000 μm containing a nonferromagnetic refractory, porous inorganic oxide component composited with a plurality of elongate ferromagnetic components, each ferromagnetic component being multi-domain, having dimensions of at least 1 μm in all directions, elongated in one direction, and having a length:diameter (L/D) ratio of at least 2 but not more than 19.5, said ferromagnetic components being present in the composite particles as inclusions within said nonferromagnetic refractory, porous inorganic oxide component, and randomly oriented and constituting at least 0.5%, but not more than $2\pi/3(L/D+1)^2$ of the total volume of each particle, where L/D is the average ratio of the longest dimension of the ferromagnetic components relative to the shortest dimension, wherein a catalytically effective amount of a catalytically active metal is dispersed on the surface of the composite particles, and the composite particles are catalytically active.

2. The composition of claim 1 wherein the volume of the ferromagnetic components contained in the composite constitute at least 5 percent, but not more than 23.3 percent of the total volume of each particle.

3. The composition of claim 2 wherein the length-:diameter ratio of the ferromagnetic components range no higher than about 5.5.

4. The composition of claim 3 wherein the porous inorganic oxide component is alumina.

5. The composition of claim 4 wherein the length-:diameter ratio of the ferromagnetic components range no higher than about 5.5.

6. The composition of claim 1 wherein the porous inorganic oxide component is alumina.

* * * * *